United States Patent
Colarusso et al.

(10) Patent No.: US 7,306,167 B2
(45) Date of Patent: Dec. 11, 2007

(54) LIGHT-ACTIVATED MIST SPRAYER SYSTEM

(75) Inventors: Joseph Thomas Colarusso, Arlington, TX (US); Dale Vilmer Kiplinger, Carrollton, TX (US); Michael Lee Paulson, Copper Canyon, TX (US); Robert Clarence Pearce, III, Arlington, TX (US)

(73) Assignee: NCH Corporation, Irving, TX (US)

( * ) Notice: Subject to any disclaimer, the term of this patent is extended or adjusted under 35 U.S.C. 154(b) by 84 days.

(21) Appl. No.: 10/970,778

(22) Filed: Oct. 21, 2004

(65) Prior Publication Data

US 2006/0086823 A1    Apr. 27, 2006

(51) Int. Cl.
*A01G 27/00*    (2006.01)
*B67D 5/08*    (2006.01)
*B67D 5/14*    (2006.01)

(52) U.S. Cl. .................. 239/69; 239/67; 239/332; 239/71; 222/59; 137/78.1; 137/78.2; 137/78.5

(58) Field of Classification Search ................. 239/63, 239/64, 67, 68, 71, 337, 548, 203, 17.19, 239/205, 206, 204, 208, 550, 565; 222/59; 137/78.1, 78.2, 78.5; 700/284; 43/124–125, 43/129, 133
See application file for complete search history.

(56) References Cited

U.S. PATENT DOCUMENTS 3,991,939 A * 11/1976 Maclay ...................... 239/63
4,015,366 A    4/1977 Hall, III
4,114,647 A * 9/1978 Sturman et al. .......... 137/624.2
4,121,767 A * 10/1978 Jensen ........................ 239/71
5,763,873 A    6/1998 Beck et al.
6,192,621 B1    2/2001 Fain
6,756,578 B1    6/2004 Kaiser
6,874,707 B2 * 4/2005 Skinner ...................... 239/542
6,957,780 B2 * 10/2005 Rosa ........................... 239/67
6,978,794 B2 * 12/2005 Dukes et al. .................. 137/1
7,097,113 B2 * 8/2006 Ivans ............................ 239/1
2005/0211796 A1 * 9/2005 Lovett ........................ 239/332

OTHER PUBLICATIONS

American Mocrosemiconductor, Triac, at least as early as Oct. 19, 2004.

* cited by examiner

*Primary Examiner*—Kevin Shaver
*Assistant Examiner*—James S. Hogan
(74) *Attorney, Agent, or Firm*—Locke Lord Bissell & Liddell LLP (57) ABSTRACT

An automatic mist-sprayer system comprising a control unit having electronic circuitry adapted to activate the sprayer for a predetermined interval in response to a sensed ambient light condition of desired intensity and duration. The system desirably further includes an electrical power supply and a plurality of spaced-apart sprayer heads. A preferred utility for the system of the invention is spraying dilute solutions of insecticide or insect repellent during the periods of significant insect activity that typically occur around dusk and dawn. Manual overrides and a remote receiving unit are also disclosed for use of the system at times other than dusk and dawn.

46 Claims, 7 Drawing Sheets

LIGHT-ACTIVATED MIST SPRAYER SYSTEM

BACKGROUND OF THE INVENTION

1. Field of the Invention

This invention relates to a system useful for spraying a fluid mist through an array of sprayer heads to treat the atmosphere in a location that is generally defined by the array, and more particularly, to a light-activated mist sprayer system that initiates a flow of treating fluid in response to a sensed ambient light condition of desired intensity and duration. Once initiated, the fluid mist spray desirably continues for a predetermined interval. A preferred application for the system is for eradicating or repelling flying or crawling insects during the periods of significant insect activity that typically occur around dusk and dawn.

2. Description of Related Art

Problems associated with the presence of mosquitoes and other flying insects are well known, particularly during summer months when people typically engage in many outdoor activities. People have long appreciated the dangers associated with mosquito-borne diseases such as malaria and equine encephalitis. More recently, publicity associated with the West Nile virus in has heightened public awareness of dangers that can be associated with mosquito bites. Additionally, people are generally aware of the pain, discomfort and potentially dangerous allergic reactions that can accompany the bites of various flying and crawling insects encountered outdoors in either urban or rural areas.

Various chemical sprays and devices have previously been used to control flying and crawling insects, spiders, and other such pests. Chemical sprays containing environmentally acceptable concentrations of insecticides or pesticides have historically been applied using hand-held sprayers, fogging machines, and the like. Such sprays are sometimes applied by governmental agencies in parks, residential neighborhoods and other high-risk urban areas, but are most often applied by individuals using hand-held sprayers in and around their own homes and yards. In more rural settings, sprayer systems have previously been used to spray insecticides or pesticides in and around barns, livestock holding areas, and the like. Other devices that have previously been used to control insects and other pests have incorporated a lure or an attractant, such as food baits, light, pheromones, or carbon dioxide, to draw the insects or pests to a trap, electrically energized grid, or poison.

Many of the prior art systems and devices for controlling insects and pests are operated directly by the user. Others are controlled by timers that are preset to initiate their function at a particular time and for a particular interval. In some cases, the electrical energy required to operate the devices, particularly those disposed in remote or rural areas where electricity is not readily available, is obtained from batteries or solar cells. U.S. Pat. No. 6,192,621, for example, discloses a pest control device for outdoor use comprising a solar-powered fan that enhances the circulation of odorous repellent to the external ambient environment. U.S. Pat. No. 5,763,873 discloses an agricultural implement for spraying herbicides on weeds that utilizes a photo-detector circuit to avoid spraying the herbicide on bare soil. The photo-detector circuit is not affected by changes in ambient lighting conditions.

Various solar-powered devices have previously been disclosed that utilize solar-powered batteries to store electrical energy during daylight hours for use in operating electric timers capable of turning one or more outdoor lights on and off daily and, in some cases, for powering those lights. The use of photocells for activating or deactivating a mechanical device upon receipt of light is also well known. Photocells are most often triggered by the impingement or interruption of a directed light beam and not by ambient light. U.S. Pat. No. 6,756,758 discloses receiver circuits for detecting a target light source that effectively remove "noise," including ambient daylight, during the operation of such devices. Other devices have been disclosed that turn one or more lights on or off in response to predetermined levels of ambient light.

U.S. Pat. No. 4,015,366 discloses a highly automated agricultural production system comprising a weather sensor package used to measure weather conditions, including the sunlight energy spectrum, the intensity of which is measured using a plant growth photometer said to be available from International Light, Inc. The system is said to optionally include a fluid delivery system useful in controlling insects and diseases, but is complex and not desirable for home use.

Mosquitoes, flies and other insects are most easily controlled when they are most active, often during the time around sunrise and sunset. The use of timers alone to activate spraying or misting systems is often inadequate for initiating spraying at the onset of the relatively short periods when such pests are most active. Timers alone are not responsive to variations in daylight hours, weather conditions and topography that can all affect ambient light levels and insect activity at a particular time of day in a particular location.

A mist sprayer system is therefore needed that will activate automatically at dusk or dawn and spray for a preset interval, that can optionally be activated manually or by using a remote transmitter, and that will be effective for eradicating or repelling flying and crawling insects, spiders and the like from outdoor areas in which the system is deployed.

SUMMARY OF THE INVENTION

The present invention is a mist sprayer system that preferably comprises an ambient light sensor, electronic circuitry that evaluates an electrical signal received from the light sensor to determine whether a "dusk" or "dawn" light condition exists; a container, reservoir or other source of treating fluid at a desired concentration; a pump that is activated at the appropriate time as determined by the sensed light condition; at least one sprayer head, and preferably an array of spaced-apart sprayer heads, each having a nozzle that will dispense a mist containing the treating fluid whenever the pump is operating; flexible tubing or other conduits providing fluid communication between the fluid source and the sprayer heads; and a timer that turns off the pump after a preset interval to terminate the spraying cycle. According to a preferred embodiment of the invention, the electronic control unit comprises a light level discrimination module, a pump control module, a power supply module, a remote receiver module, and optionally, a remote transmitter for activating the pump control module.

One preferred application for the system is for spraying a mist comprising a treating fluid useful for eradicating or repelling flying or crawling insects such as mosquitoes, wasps, bees, spiders, and the like, that may be injurious to humans or livestock. Examples of outdoor areas that can be serviced by the systems of the invention include, for example, residential or commercial yard and patio areas, swimming pools, outdoor restaurants, horse and livestock barns, garbage dumpsters and compactors, food processing plants, parks and picnic areas, boat houses, dog kennels, zoos, amusement parks, industrial sites, and the like. Systems of the invention can similarly be used for controlling insects and the diseases they carry in vineyards, vegetable fields, orchards, greenhouses, nurseries and such, or for repelling dogs and wild animals such as foxes, squirrels, rabbits, and the like, that can become pests in gardens or other restricted areas. With an appropriate treating fluid, for example, the system of the invention can possibly be used to repel rabbits or birds from aircraft taxi and runway areas on airport properties.

The system of the invention can be easily, effectively and reliably used to dispense a variety of treating fluids, most preferably liquids, but optionally, gases or liquids containing dissolved, entrained or suspended gaseous or powdered solid components. The treating fluids are preferably dispensed as a mist, and are preferably selected from known, commercially available insecticides, pesticides, insect or pest repellents, fungicides, biocides, and the like, and can optionally include an attractant component as a lure. It will also be appreciated upon reading the disclosure that the subject system can likewise be used for dispensing other treating fluids "on demand" including, for example, liquid fertilizers, air fresheners, cooling water, and the like, and at times other than dusk and dawn.

The system of the invention replaces standard timers or programmed controllers previously used in automated dispensing systems, and, because the dispensing cycles are triggered by prevailing ambient light levels, will typically operate only during the times when flying and crawling insects and pests are most active. By automatically initiating chemical treating for defined intervals during the periods of greatest insect activity, the user is able to reduce the amount of treating fluid required, and to thereby achieve better results at lower cost. The system is automatically responsive to use in various time zones and topographies, and will automatically adapt to the lengthening and shortening daylight hours that are normally associated with seasonal changes. In addition to having an automatic light-activated capability unlike that of other known systems and devices, the mist sprayer system of the invention can also be activated manually or by using a wireless remote transmitter if desired.

BRIEF DESCRIPTION OF THE DRAWINGS

The apparatus of the invention is further described and explained in relation to the following drawings wherein.

DESCRIPTION OF THE PREFERRED EMBODIMENTS

Figure 1:
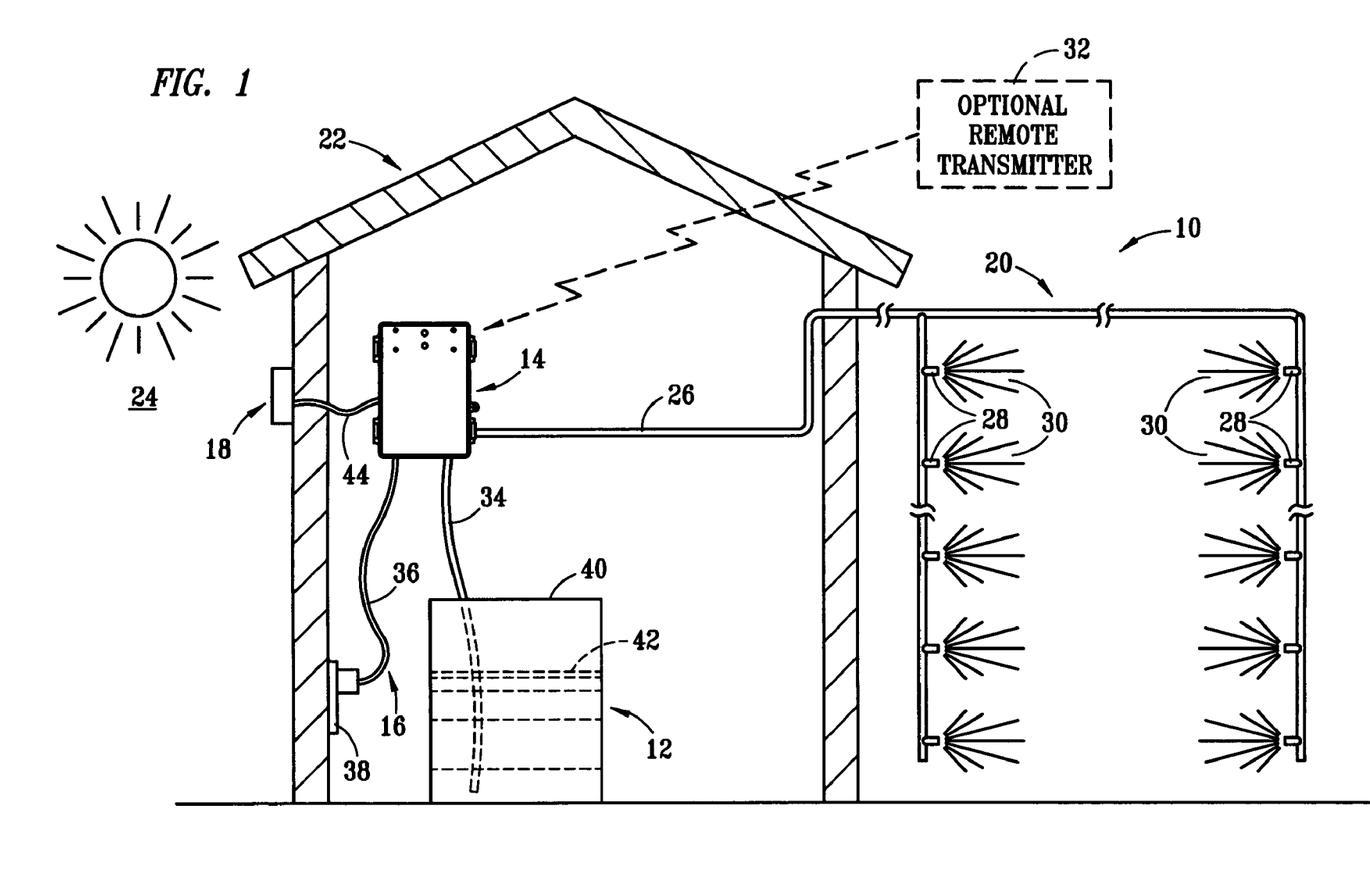
FIG. 1 is a simplified diagrammatic view of a preferred embodiment of the light-activated mist sprayer system of the invention as installed.

Referring to FIG. 1, light-activated mist sprayer system 10 of the invention preferably comprises treating fluid source 12, electronic control unit 14, electrical power supply 16, ambient light sensor 18, and array 20 of sprayer heads 28 discharging mist 30 received from fluid source 12 through tubing or conduits 34, 26. System 10 is disclosed as installed in a building structure 22, with all components except ambient light sensor 18 and array 20 being disposed inside. Ambient light sensor 18 is desirably positioned so that it is not blocked from receiving the prevailing ambient light by trees, overhangs, screening structures, or the like, although it is not necessary that it be positioned to receive direct light from the sun 24 or another light source. When positioning light sensor 18, care should also be given to avoiding locations where flood lights, car lights, or the like, can impinge directly on the sensor, thereby impeding the ability of the sensor to monitor the prevailing ambient light conditions. Light sensor 18 will desirably generate and feed an electrical signal to electronic control unit 14 through wire 44 or, alternatively, by means of a wireless RF transmitter (not shown). It will be appreciated upon reading the disclosure that sensor 18 can be satisfactorily mounted on buildings, poles, fences, or other structures meeting the positioning criteria described above.

Fluid source 12 is depicted for illustrative purposes as a container 40 comprising a liquid treating fluid 42, which can be withdrawn from container 40 through tubing 34 by a pump 62 disposed inside electronic control unit 14 as shown and further described below in relation to FIG. 3. When activated, pump 62 preferably discharges the pressurized treating fluid into conduits 26, which feed treating fluid 42 to a plurality of spaced-apart sprayer heads 28, each of which preferably comprise a nozzle configured to spray a mist 30 comprising treating fluid 42. As shown, container 40 is simply a reservoir for a liquid treating fluid 42, which can, for example, be a diluted aqueous solution of a suitable insecticide, pesticide, fungicide, or the like. For most applications, container 40 will have a capacity ranging between about 2.5 gallons and about 55 gallons. Tubing 34 is preferably heavy duty, flexible polyethylene tubing and conduit 26 can also be made of polyethylene tubing, PVC pipe, or any other similarly effective material that complies with applicable regulatory codes that are applicable for the intended use and the particular treating fluid.

According to an alternative embodiment, container 40 can be provided with a stirring device capable of dissolving or suspending an active ingredient comprising a finely divided solid material in the liquid. According to another alternative embodiment, container 40 or discharge line 26 can be provided with an aeration device capable of dissolving or entraining a gaseous component in the liquid. According to yet another alternative embodiment, container 40 and pump 62 can be replaced or supplemented in system 10 by another pressurized fluid source or other supplemental devices such as a pressurized water supply line flow-controlled by a solenoid valve, with an injection pump used to introduce the treating fluid.

According to a particularly preferred embodiment of the invention for residential outdoor use, array 20 will desirably comprise from about 15 to about 60 sprayer heads 28 spaced from about 10 to about 20 feet apart. Beneficial advantages are achieved if sprayer heads 28 are positioned from about 6 to 10 feet above ground level. Conduits 26 are desirably configured in such manner that the pressure is balanced throughout array 20 so that pump 62 (FIG. 3) can supply treating fluid 42 to each sprayer head 28 at a pressure ranging from about 70 to about 160 psi, and most preferably about 130 psi. Each sprayer head 28 preferably further comprises a normally closed, no-drip valve and a spray nozzle made of brass, stainless steel or a suitable polymeric material that is chemically resistant to the composition of treating fluid 42 and that is able to withstand pressures within the intended operating ranges. The flow rate through each nozzle will preferably be about 0.6 gpm, although it will be appreciated that both higher and lower flow rates can be used effectively in the operation of sprayer system 10.

Electrical power for sprayer system 10 is preferably supplied by 110V or 220V line current fed from conventional outlet 38 through power cord 36 to electronic control unit 14. Although it is intended that operation of pump 62 of sprayer system 10 is to be initiated primarily on the basis of inputs received from ambient light sensor 18, electronic control unit 14 preferably further comprises a start/stop switch 61 that is readily accessible on the front of unit 14, as discussed below in relation to FIG. 2, and functions as a manual override. Electronic control unit 14 also preferably comprises an RF antenna and receiver circuit capable of activating pump 62 upon receipt of a radio signal from optional remote transmitter 32.

Figure 2:
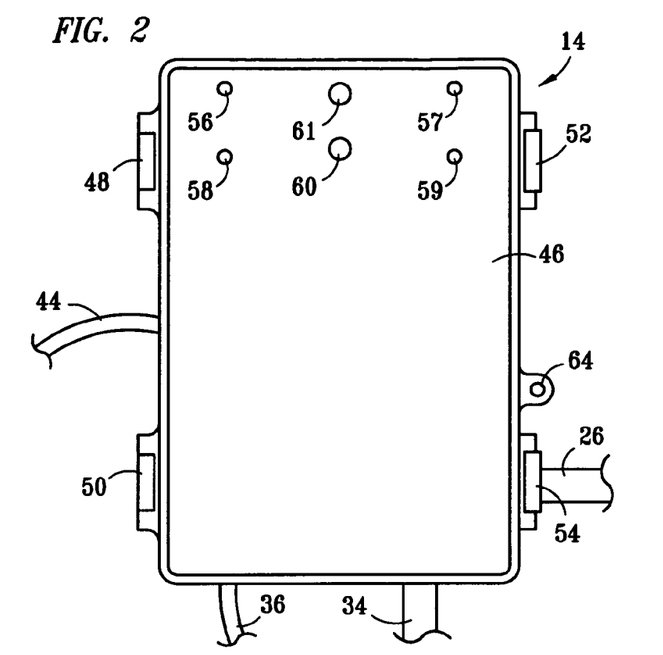
FIG. 2 is a front elevation view of a preferred electronic control unit for use with the light-activated mist sprayer system of the invention.
Figure 3:
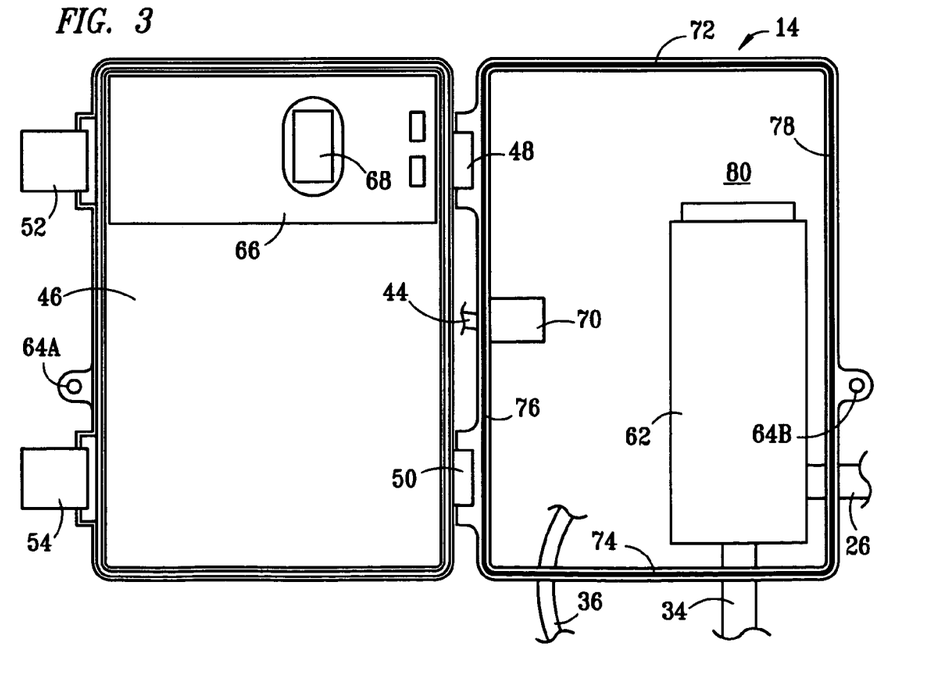
FIG. 3 is a front elevation view of the control unit of FIG. 2, with the door opened.

Referring to FIGS. 2 and 3, electronic control unit 14 preferably further comprises a housing having top wall 72, bottom wall 74, side walls 76, 78 and back wall 80. Front door 46 is preferably attached to side wall 76 by hinges 48, 50. Fasteners 52, 54 are preferably provided to secure door 46 to side wall 78 when closed, and cooperatively aligned tabs 64A, 64B are provided for use in locking control unit 14 if desired. The housing for electronic control unit 14 is preferably made of metal or a suitable polymeric material, and is preferably weather-tight, although moisture seals are not shown in the drawings. Printed circuit board 66 is desirably installed inside door 46 so that LEDs 56, 57, 58 and 59 are visible from the front through door 46. LEDs 56, 58 are preferably red and green, respectively, and indicate whether electrical power to control unit 14 is on or off. LEDs 57, 59 are also preferably red and green, respectively, and indicate whether pump 62 is on or off. Switches 60, 61 are preferably push-button switches. Switch 60 turns the electrical power on or off and switch 61 is a manual override switch that turns pump 62 on or off independently of light conditions. Transformer 68 is a step-down transformer that is preferentially integrated into PC board 66, although it will be appreciated that a stand-alone transformer can likewise be included in electronic control unit 14 if desired. The housing of electronic control unit 14 preferably further comprises weather-tight connectors for receiving electrical power cord 36, light sensor wire 44 plugging into jack 70, and inlet and outlet connections for tubing 34 and conduit 26 to pump 62. The electrical connections and circuitry inside a preferred embodiment of electronic control unit 14 are shown in greater detail in FIGS. 6a-6d, and are discussed below. It should be understood that FIGS. 2 and 3 are presented for illustrative purposes only, and that the configuration and arrangement of components within electronic control unit 14 can vary substantially from that shown within the scope of the invention.

Figure 4:
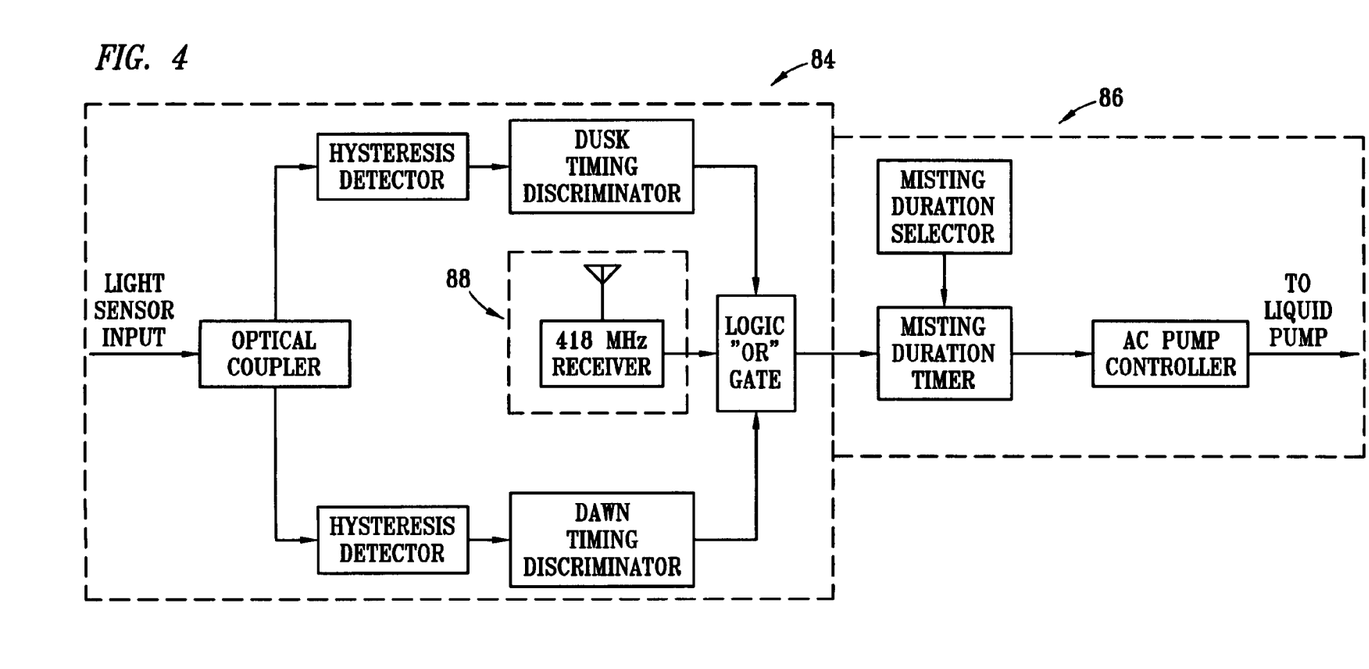
FIG. 4 is a simplified flowchart illustrating diagrammatically the various components and logic implemented in a preferred electronic control unit suitable for use in the light-activated mist sprayer system of the invention.
Figure 5:
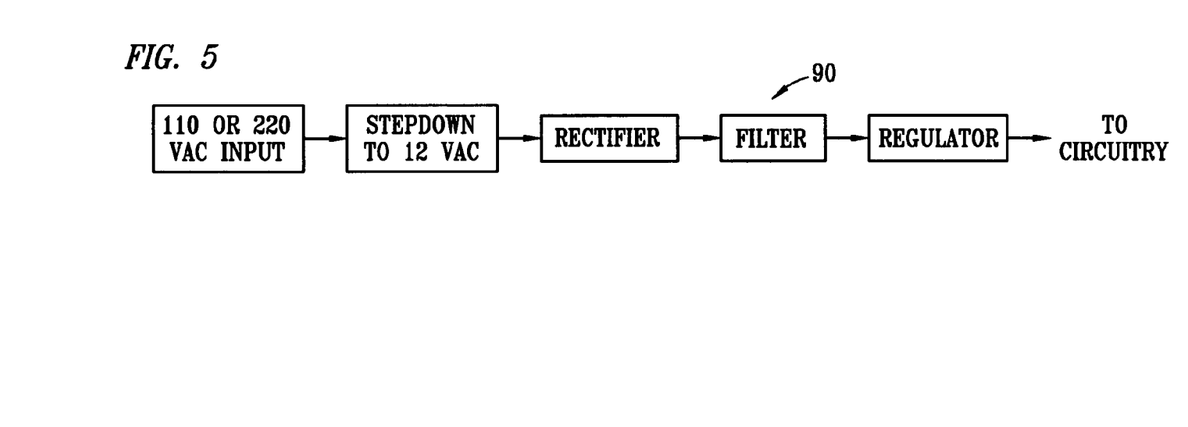
FIG. 5 is a simplified flowchart illustrating diagrammatically the various components of a preferred electrical power supply for use in the light-activated mist sprayer system of the invention.
Figure 6A:
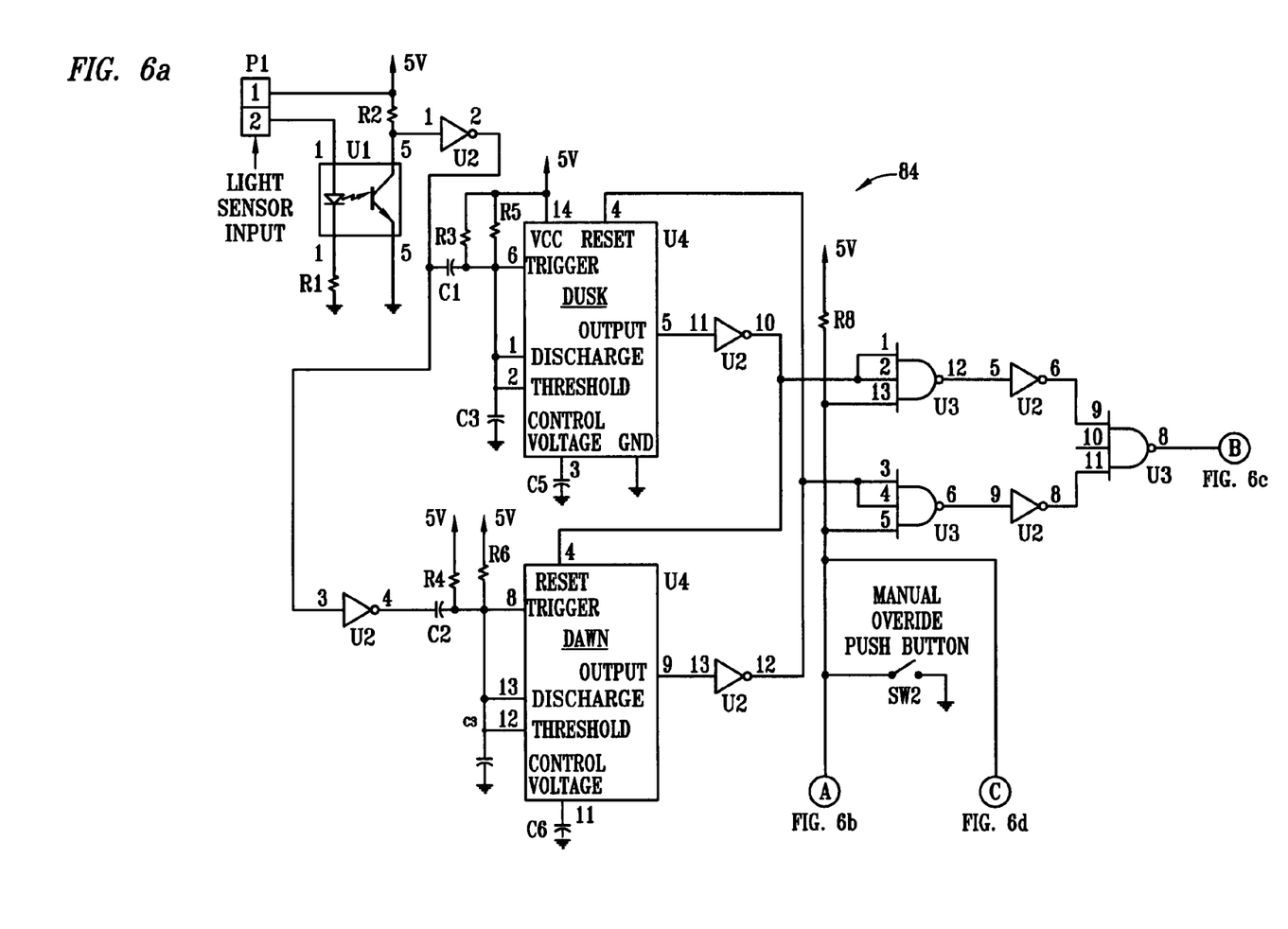
FIG. 6a is a circuit diagram depicting electronic circuitry suitable for use in the light sensing and discrimination section of the electronic control unit of the invention.

FIGS. 4, 5 and 6a-6d of the drawings are provided to illustrate preferred logic and circuitry useful in electronic control unit 14 of system 10, although it should be appreciated that other similarly effective circuitry and components can likewise be used in implementing the operational objectives of mist sprayer system 10. FIGS. 4 and 6a depict a preferred embodiment of light level discrimination section 84 of electronic control unit 14, in which an electronic signal received from light sensor 18 (FIG. 1), a conventional, commercially available device, is received into optical coupler U1. The signal is then split and fed through two parallel hysteresis detectors to insure that pump 62 is not activated by transient signals attributable to stimuli other than a gradual darkening or lightening of ambient light to a predetermined "trigger" level. So-called "dusk" and "dawn" discriminators U4 then compare the signal being received from light sensor 18 to predetermined signal values consistent with "dusk" and "dawn" ambient light conditions. Parallel nand gates receive the signals from the discriminators, and assuming that the pump start criteria has been met, signal pump controller module 86 to start pump 62. Optionally, a manual override push button switch SW2 is provided for use in manually starting pump 62 at a time other than as determined by light level discrimination module 84.

Figure 6B:
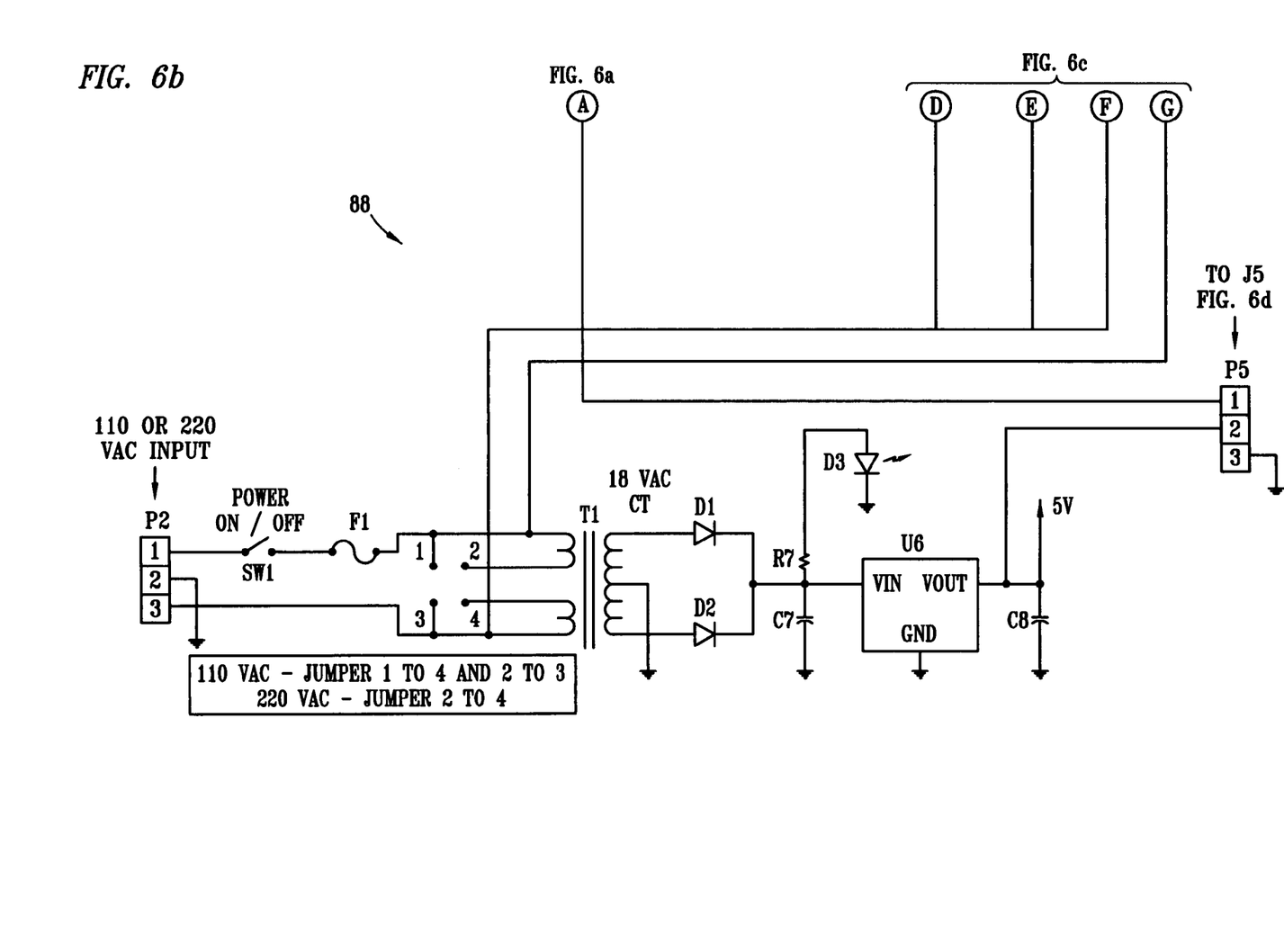
FIG. 6b is a circuit diagram depicting electronic circuitry suitable for use in establishing an electrical power supply for the various electrical components of the invention.
Figure 6C:
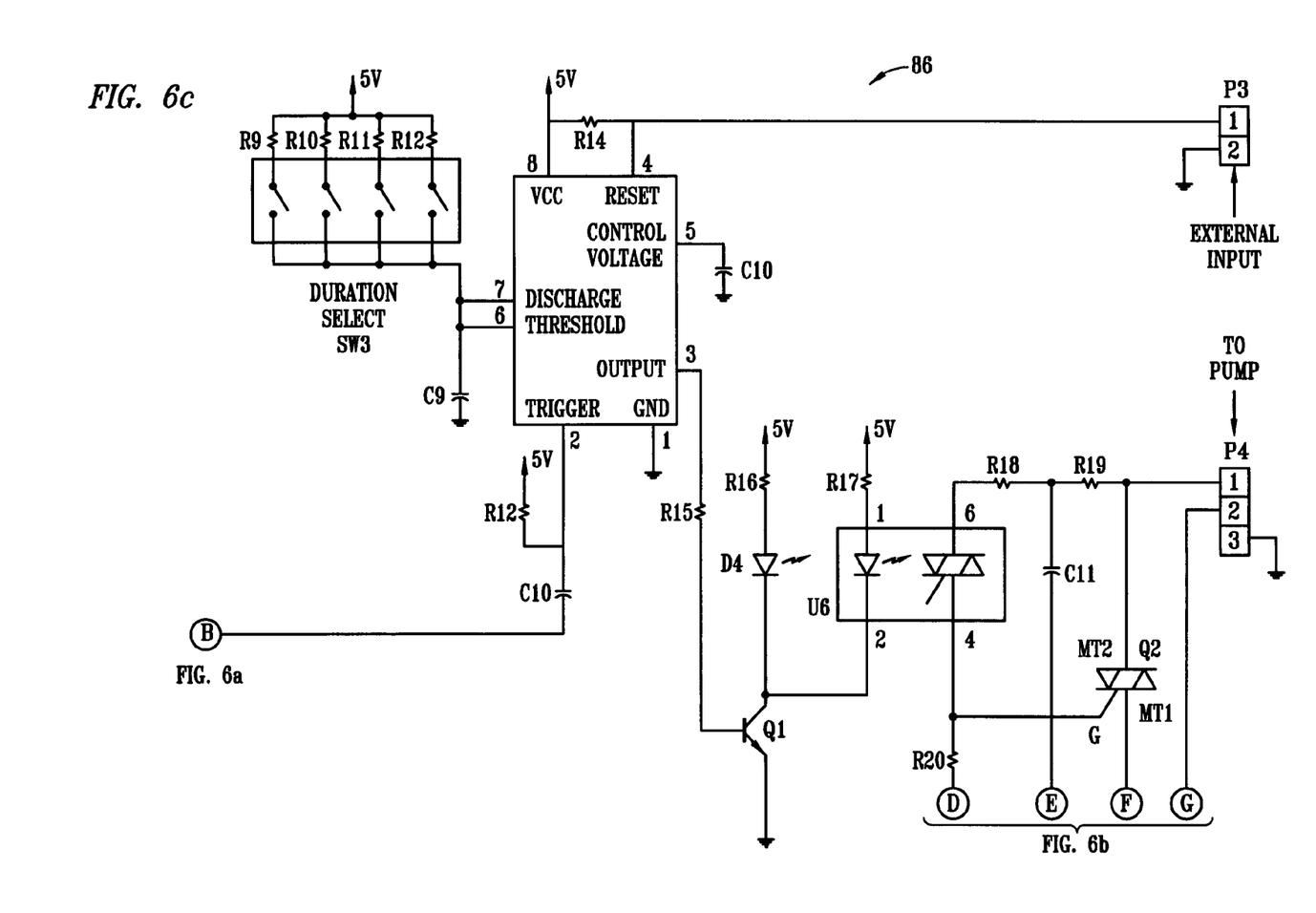
FIG. 6c is a circuit diagram depicting electronic circuitry suitable for use in the pump activation and timer portion of the electronic control unit of the invention.

Referring to FIGS. 5 and 6b, power supply module 90 preferably comprises a 110 volt (or 220 volt) AC input current, a step-down transformer to reduce the current to 12V, a rectifier to convert the 12V from alternating to direct current, a filter and a regulator. The 12V DC current is then fed to the circuitry on PC board 66 (FIG. 3) and 110 volt AC line current upstream of the transformer is desirably fed to pump 62 (FIG. 3) as shown in FIG. 6c. An on/off power switch SW1 (60 in FIG. 2) and fuse F1 are desirably provided between the inlet power plug P2 (FIG. 6b) and transformer 68 (FIG. 3).

Referring to FIGS. 4 and 6c, pump start module 86 preferably comprises a misting duration selector, a misting duration timer, and a controller for the AC pump 62 (FIG. 3). Referring to FIG. 6c, the desired duration of each pumping cycle is set using SW3. The pump controller preferably uses triac Q2 to initiate the pumping cycle upon receipt of an electronic signal from light level discrimination module 84, the usual operational stimulus; or from manual override switch SW2 (FIG. 6a); or from the RF remote receiver module 88, described below in relation to FIGS. 4 and 6d.

Figure 6D:
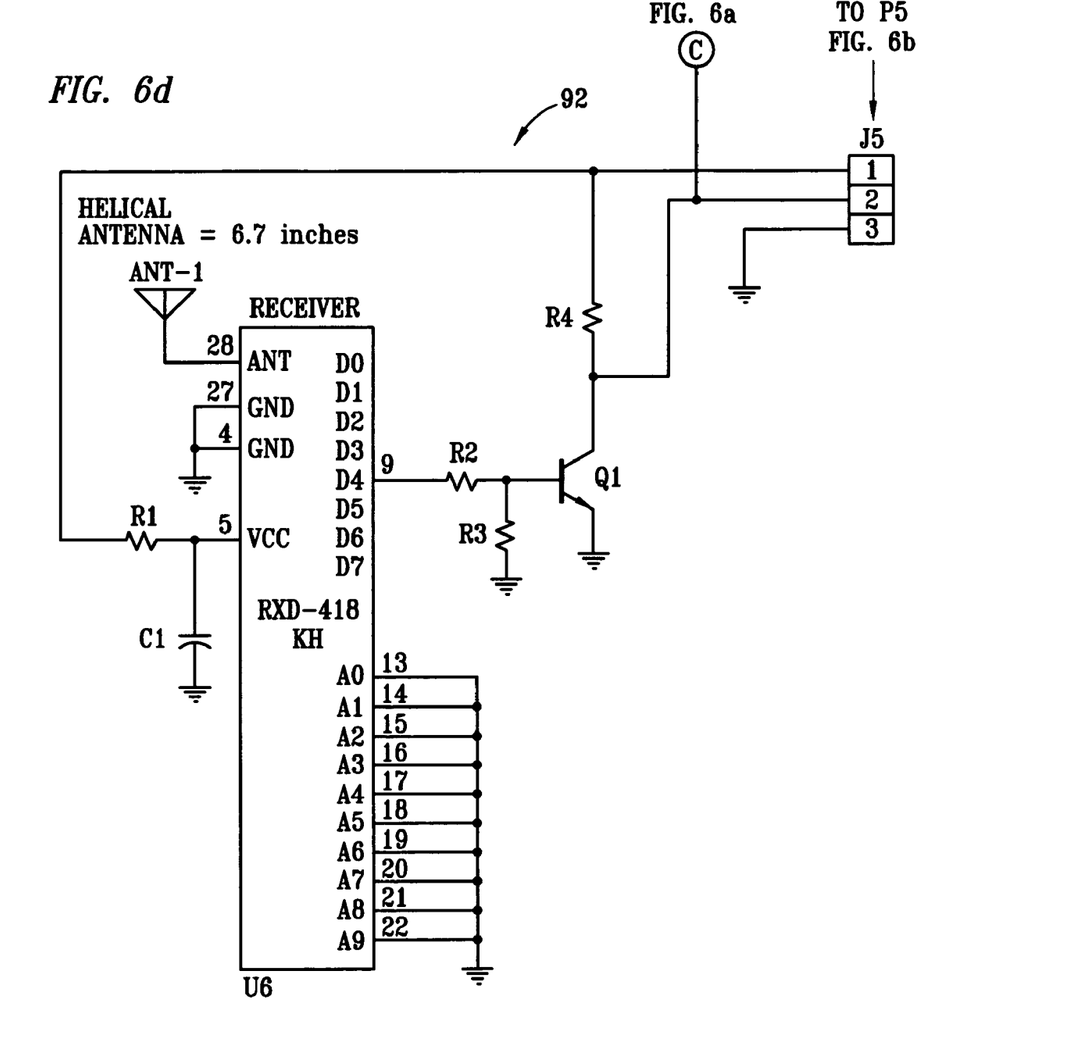
FIG. 6d is a circuit diagram depicting an antenna and electronic circuitry suitable for use in receiving a pump activation signal from an optional wireless remote transmitter.

Referring to FIGS. 4 and 6d, RF remote receiver module 88 is preferably provided as part of PC board 66 (FIG. 3) in case the user desires to have the capability of manually initiating a pumping cycle of operation using an optional remote transmitter 32 (FIG. 1). This might occur, for example, if a "bug problem" is experienced during a particular time other than at dusk or dawn, or if system 10 is being used, for example, as a cool-water mist dispensing system during an outdoor activity at a time between dusk and dawn. Remote receiving unit 88 preferably comprises an antenna and pin selectors for synchronizing the receiver to the remote transmitter unit. Remote receiving unit 88 is powered by 12V direct current received from power supply module 90 as discussed above.

Other alterations and modifications of the invention will likewise become apparent to those of ordinary skill in the art upon reading this specification in view of the accompanying drawings, and it is intended that the scope of the invention disclosed herein be limited only by the broadest interpretation of the appended claims to which the inventors are legally entitled.

We claim:

1. A fluid mist sprayer system comprising:
   a source of treating fluid;
   an electrical power source;
   a pump for pressurizing the treating fluid as needed to discharge the treating fluid at a predetermined discharge pressure and flow rate;
   at least one sprayer head configured to receive the pressurized treating fluid and to discharge the treating fluid in the form of a mist;
   at least one flow conduit providing fluid communication between the source and the at least one sprayer head;
   an ambient light sensor;
   an electronic control unit that initiates a flow of pressurized treating fluid to the at least one sprayer head in response to sensed ambient light of predetermined intensity and duration, wherein the predetermined intensity and duration are those that occur at dusk and dawn; and
   wherein the electronic control unit further comprises a light level discrimination module, a pump controller module, a power supply module, and a remote receiver module.

2. The fluid mist sprayer system of claim 1 wherein the treating fluid is selected from liquids, gases, suspensions, and mixtures thereof.

3. The fluid mist sprayer system of claim 2 wherein the treating fluid is selected from the group consisting of insecticide, pesticide, fungicide, biocide, insect repellent, water, air, or mixtures thereof.

4. The fluid mist sprayer system of claim 2 wherein the treating fluid comprises an insect attractant.

5. The fluid mist sprayer system of claim 4 wherein the attractant is carbon dioxide gas.

6. The fluid mist sprayer system of claim 1 wherein the light level discrimination module comprises an optical coupler, a hysteresis detector, dusk and dawn timing discriminators, and a logic gate communicating with the pump controller module.

7. The fluid mist sprayer system of claim 1 wherein the pump controller module comprises a misting duration selector, a misting duration timer and an AC pump controller.

8. The fluid mist sprayer system of claim 1 wherein the power supply module comprises a step-down transformer, a rectifier, a filter and a regulator.

9. The fluid mist sprayer system of claim 1 wherein the remote receiver module comprises an RF antenna and a receiver.

10. The fluid mist sprayer system of claim 1 wherein the pump controller module further comprises a manual start/stop switch.

11. The fluid mist sprayer system of claim 1 comprising an array of spaced-apart fluid sprayer heads communicating with the pump through at least one conduit.

12. The fluid mist sprayer system of claim 9, further comprising a wireless remote transmitter synchronized to the receiver.

13. The fluid mist sprayer system of claim 1 comprising a housing that contains the electronic control unit and the pump.

14. The fluid mist sprayer system of claim 1 wherein the pump has an inlet that draws treating fluid from a container.

15. The fluid mist sprayer system of claim 11 wherein the pump has an outlet disposed in fluid communication with the array.

16. The fluid mist sprayer system of claim 1 wherein the ambient light sensor is spaced apart from the electronic control unit.

17. A fluid mist sprayer system comprising:
    a source of treating fluid;
    an electrical power source;
    a pump for pressurizing the treating fluid as needed to discharge the treating fluid at a predetermined discharge pressure and flow rate;
    at least one sprayer head configured to receive the pressurized treating fluid and to discharge the treating fluid in the form of a mist;
    at least one flow conduit providing fluid communication between the source and the at least one sprayer head;
    an ambient light sensor;
    an electronic control unit that initiates a flow of pressurized treating fluid to the at least one sprayer head in response to sensed ambient light of predetermined intensity and duration, the electronic control unit further comprising a light level discrimination module, a pump controller module, a power supply module, and a remote receiver module.

18. The fluid mist sprayer system of claim 17 wherein the treating fluid is selected from liquids, gases, suspensions, and mixtures thereof.

19. The fluid mist sprayer system of claim 18 wherein the treating fluid is selected from the group consisting of insecticide, pesticide, fungicide, biocide, insect repellent, water, air, or mixtures thereof.

20. The fluid mist sprayer system of claim 18 wherein the treating fluid comprises an insect attractant.

21. The fluid mist sprayer system of claim 20 wherein the attractant is carbon dioxide gas.

22. The fluid mist sprayer system of claim 17 wherein the light level discrimination module comprises an optical coupler, a hysteresis detector, dusk and dawn timing discriminators, and a logic gate communicating with the pump controller module.

23. The fluid mist sprayer system of claim 17 wherein the pump controller module comprises a misting duration selector, a misting duration timer and an AC pump controller.

24. The fluid mist sprayer system of claim 17 wherein the power supply module comprises a step-down transformer, a rectifier, a filter and a regulator.

25. The fluid mist sprayer system of claim 17 wherein the remote receiver module comprises an RF antenna and a receiver.

26. The fluid mist sprayer system of claim 17 wherein the pump controller module further comprises a manual start/stop switch.

27. The fluid mist sprayer system of claim 17 comprising an array of spaced-apart fluid sprayer heads communicating with the pump through at least one conduit.

28. The fluid mist sprayer system of claim 25, further comprising a wireless remote transmitter synchronized to the receiver.

29. The fluid mist sprayer system of claim 17 comprising a housing that contains the electronic control unit and the pump.

30. The fluid mist sprayer system of claim 17 wherein the pump has an inlet that draws treating fluid from a container.

31. The fluid mist sprayer system of claim 27 wherein the pump has an outlet disposed in fluid communication with the array.

32. A fluid mist sprayer system comprising:
a source of treating fluid;
an electrical power source;
a pump for pressurizing the treating fluid as needed to discharge the treating fluid at a predetermined discharge pressure and flow rate;
at least one sprayer head configured to receive the pressurized treating fluid and to discharge the treating fluid in the form of a mist;
at least one flow conduit providing fluid communication between the source and the at least one sprayer head;
an ambient light sensor;
an electronic control unit that initiates a flow of pressurized treating fluid to the at least one sprayer head in response to sensed ambient light of predetermined intensity and duration, wherein the electronic control unit further comprises a light level discrimination module, a pump controller module, a power supply module, and a remote receiver module; and
wherein the ambient light sensor is spaced apart from the electronic control unit.

33. The fluid mist sprayer system of claim 32 wherein the treating fluid is selected from liquids, gases, suspensions, and mixtures thereof.

34. The fluid mist sprayer system of claim 33 wherein the treating fluid is selected from the group consisting of insecticide, pesticide, fungicide, biocide, insect repellent, water, air, or mixtures thereof.

35. The fluid mist sprayer system of claim 33 wherein the treating fluid comprises an insect attractant.

36. The fluid mist sprayer system of claim 34 wherein the attractant is carbon dioxide gas.

37. The fluid mist sprayer system of claim 32 wherein the light level discrimination module comprises an optical coupler, a hysteresis detector, dusk and dawn timing discriminators, and a logic gate communicating with the pump controller module.

38. The fluid mist sprayer system of claim 32 wherein the pump controller module comprises a misting duration selector, a misting duration timer and an AC pump controller.

39. The fluid mist sprayer system of claim 32 wherein the power supply module comprises a step-down transformer, a rectifier, a filter and a regulator.

40. The fluid mist sprayer system of claim 32 wherein the remote receiver module comprises an RF antenna and a receiver.

41. The fluid mist sprayer system of claim 32 wherein the pump controller module further comprises a manual start/stop switch.

42. The fluid mist sprayer system of claim 32 comprising an array of spaced-apart fluid sprayer heads communicating with the pump through at least one conduit.

43. The fluid mist sprayer system of claim 40, further comprising a wireless remote transmitter synchronized to the receiver.

44. The fluid mist sprayer system of claim 32 comprising a housing that contains the electronic control unit and the pump.

45. The fluid mist sprayer system of claim 32 wherein the pump has an inlet that draws treating fluid from a container.

46. The fluid mist sprayer system of claim 42 wherein the pump has an outlet disposed in fluid communication with the array.

* * * * *

UNITED STATES PATENT AND TRADEMARK OFFICE
CERTIFICATE OF CORRECTION

PATENT NO. : 7,306,167 B2  Page 1 of 1
APPLICATION NO. : 10/970778
DATED : December 11, 2007
INVENTOR(S) : Colarusso et al.

It is certified that error appears in the above-identified patent and that said Letters Patent is hereby corrected as shown below:

Column 9, claim 36,

Line 31 - claim 34 should be claim 35 and reads as follows:

"The fluid mist sprayer system of claim 35 wherein the attractant is carbon dioxide gas."

Signed and Sealed this

Third Day of February, 2009

JOHN DOLL
*Acting Director of the United States Patent and Trademark Office*